United States Patent
Nakatani et al.

(10) Patent No.: US 12,098,310 B2
(45) Date of Patent: Sep. 24, 2024

(54) HOT-MELT ADHESIVE COMPOSITION

(71) Applicant: BOSTIK SA, Colombes (FR)

(72) Inventors: Hiroyuki Nakatani, Osaka (JP);
Tsuyoshi Yamanoue, Osaka (JP)

(73) Assignee: BOSTIK SA, Colombes (FR)

( * ) Notice: Subject to any disclaimer, the term of this patent is extended or adjusted under 35 U.S.C. 154(b) by 220 days.

(21) Appl. No.: 17/786,201

(22) PCT Filed: Dec. 17, 2020

(86) PCT No.: PCT/EP2020/086896
§ 371 (c)(1),
(2) Date: Jun. 16, 2022

(87) PCT Pub. No.: WO2021/123070
PCT Pub. Date: Jun. 24, 2021

(65) Prior Publication Data
US 2023/0026879 A1    Jan. 26, 2023

(30) Foreign Application Priority Data

Dec. 20, 2019 (EP) ..................... 19306712

(51) Int. Cl.
*C09J 7/35*        (2018.01)
*C09J 11/08*       (2006.01)
(Continued)

(52) U.S. Cl.
CPC ............... *C09J 7/35* (2018.01); *C09J 11/08* (2013.01); *C09J 123/0815* (2013.01);
(Continued)

(58) Field of Classification Search
CPC .............. C09J 11/08; C09J 123/0815; C09J 123/0853; C09J 123/12; C09J 125/10;
(Continued)

(56) References Cited

U.S. PATENT DOCUMENTS

| 7,423,071 B2 | 9/2008 | Mogami et al. |
| 9,982,171 B2 | 5/2018 | Kanderski et al. |

(Continued)

FOREIGN PATENT DOCUMENTS

| CN | 105399902 A | 3/2016 |
| CN | 107033810 A | 8/2017 |

(Continued)

OTHER PUBLICATIONS

European Patent Office, Extended European Search Report Issued in Application No. 19306712.1, Jun. 5, 2020, Germany, 6 pages.

(Continued)

*Primary Examiner* — Philip C Tucker
*Assistant Examiner* — Brian R Slawski
(74) *Attorney, Agent, or Firm* — Alleman Hall & Tuttle LLP (57) ABSTRACT

The invention relates to a hot-melt adhesive composition, comprising at least one polyolefin polymer at a content from 5 to 90% by weight; at least one branched polypropylene at a content from 0.1 to 10% by weight; at least one tackifying resin at a content from 0.1 to 60% by weight; optionally, at least one styrene block copolymer from 0 to 30% by weight; optionally, at least one plasticizer at a content from 0 to 30% by weight; optionally, at least one stabilizer at a content from 0 to 5% by weight; and optionally, at least one wax at a content from 0 to 30% by weight. The invention further relates to the use of a branched polypropylene for reducing stringing of a hot-melt adhesive composition.

19 Claims, 1 Drawing Sheet (51) Int. Cl.
*C09J 123/08* (2006.01)
*C09J 123/12* (2006.01)
*C09J 125/10* (2006.01)

(52) U.S. Cl.
CPC ....... *C09J 123/0853* (2013.01); *C09J 123/12* (2013.01); *C09J 125/10* (2013.01); *C09J 2203/334* (2013.01); *C09J 2301/304* (2020.08); *C09J 2301/408* (2020.08); *C09J 2301/414* (2020.08)

(58) Field of Classification Search
CPC .......... C09J 2203/334; C09J 2301/304; C09J 2301/408; C09J 2301/414; C09J 7/35
USPC ............ 156/60, 325, 326, 327, 334, DIG. 1, 156/DIG. 2, DIG. 3, DIG. 4, DIG. 5; 428/347, 348, 349; 525/70, 240
See application file for complete search history.

(56) References Cited

U.S. PATENT DOCUMENTS

| | | |
|---|---|---|
| 2005/0106385 A1 | 5/2005 | Martin et al. |
| 2007/0032600 A1 | 2/2007 | Mogami et al. |
| 2010/0132886 A1* | 6/2010 | Rodriguez ............. C09J 123/14 156/334 |
| 2011/0111243 A1* | 5/2011 | Laiho .................... B32B 27/306 428/512 |
| 2016/0002508 A1 | 1/2016 | Kanderski et al. |

FOREIGN PATENT DOCUMENTS

| | | |
|---|---|---|
| JP | H07331221 A | 12/1995 |
| JP | H0812962 A | 1/1996 |
| JP | H1161067 A | 3/1999 |
| JP | H11199833 A | 7/1999 |
| JP | H11236543 A | 8/1999 |
| JP | 2003119444 A | 4/2003 |
| JP | 2004099768 A | 4/2004 |
| JP | 2005256061 A | 9/2005 |
| JP | 2005325222 A | 11/2005 |
| JP | 2007051235 A | 3/2007 |
| JP | 2008214539 A | 9/2008 |
| WO | 2006082478 A2 | 8/2006 |
| WO | 2006082478 A3 | 8/2006 |
| WO | 2012115279 A1 | 8/2012 |

OTHER PUBLICATIONS

ISA European Patent Office, International Search Report Issued in Application No. PCT/EP2020/086896, Mar. 16, 2021, WIPO, 4 pages.

* cited by examiner

HOT-MELT ADHESIVE COMPOSITION

TECHNICAL FIELD

The present invention relates to a hot-melt adhesive composition comprising a branched polypropylene. The present invention also relates to the use of said branched polypropylene to reduce stringing of the hot-melt adhesive composition.

TECHNICAL BACKGROUND

Hot-melt adhesives are widely used in various applications, such as packaging, bookbinding and woodworking, as they have good stability and do not require the use of solvents.

However, hot-melt adhesives tend to cause stringing for example in the bonding of cardboard boxes and carton cases, which causes a number of issues such as contaminating the production line or the finishing products (packages), therefore leading to defective products, or even affecting the manufacture process. A typical application procedure for hot-melt adhesives includes a nozzle coating. By "stringing" is meant a phenomenon which occurs when some of the hot-melt adhesive material is left behind on the nozzle and gets pulled down the line. In this procedure, stringing is generated even after the "OFF" signal, due to delay in response by the nozzle cavity or mechanical shielding (spring back). This stringing becomes more remarkable when the distance between the nozzle and the article to which the adhesive is applied becomes larger, when the line speed is high or when the melt viscosity of the hot-melt adhesive is high. Thus, when stringing occurs, the operator must stop the application lines and remove the strings.

Many attempts have been made in order to reduce the stringing of hot-melt adhesives. Among them, some methods include hot-melt adhesive compositions comprising polypropylene with acidic groups. However, such compositions are dense and tend to sink to the bottom, which can cause nozzle clogging during long-term use.

Document JP 2008214539 relates to a polyolefin-based hot melt adhesive including a stringing reducing agent obtained by modifying a polyolefin with an unsaturated carboxylic acid, anhydride or ester.

Document WO 2006/082478 relates to a hot-melt adhesive composition containing a first component comprising at least one ethylene/$C_3$-$C_{20}$ α-olefin copolymer, a second component comprising at least one ethylene/(meth)acrylic acid ester copolymer in an amount of 6 to 12 parts by weight per 100 parts by weight of the first component, and a third component comprising at least one tackifying resin, in an amount of 50 to 200 parts by weight per 100 parts by weight of the first component, the third component being compatible with the first and second components.

Document JP2003119444 relates to a low-viscosity hot-melt adhesive composition comprising an olefinic polymer that bears carboxy, acid anhydride and/or hydroxy groups and has high hydrogen bond-forming tendency, and an ethylene-vinyl acetate copolymer, and/or an ethylene-acrylic ester copolymer.

Document JPH1161067 discloses blending a specified fumed silica into a hot-melt adhesive composition containing a specified ethylene/unsaturated ester copolymer, a tackifying resin and a wax, in order to reduce stringing.

Other hot-melt adhesive compositions are known from documents JPH07331221, JPH11236543, JPH11199833, JPH08012962, JP2004099768, JP2005325222, JP2007051235 and JP2005256061.

Therefore, there is a need for a hot melt adhesive composition that can provide good quality products and that makes it possible to limit or avoid stringing and has excellent thermal stability without compromising the manufacturing process.

SUMMARY OF THE INVENTION

It is a first object of the invention to provide a hot-melt adhesive composition, comprising:
- at least one polyolefin polymer at a content from 5 to 90% by weight;
- at least one branched polypropylene at a content from 0.1 to 10% by weight;
- at least one tackifying resin at a content from 0.1 to 60% by weight;
- optionally, at least one styrene block copolymer from 0 to 30% by weight;
- optionally, at least one plasticizer at a content from 0 to 30% by weight;
- optionally, at least one stabilizer at a content from 0 to 5% by weight; and
- optionally, at least one wax at a content from 0 to 30% by weight.

According to some embodiments, the branched polypropylene is a homopolymer or a copolymer, said copolymer preferably comprising at least 50% by weight of propylene units.

According to some embodiments, the branched polypropylene is present at a content from 0.5 to 5% by weight of the composition.

According to some embodiments, the branched polypropylene is obtained by reaction of a linear polypropylene polymer with a conjugated diene.

According to some embodiments, the branched polypropylene has a strain hardening degree (λmax) equal to or higher than 2.0.

According to some embodiments, the polyolefin polymer is chosen from an ethylene-vinyl acetate polymer, a methyl methacrylate polymer, a vinyl acetate polymer, an ethylene-methyl methacrylate polymer, an ethylene-butyl acrylate polymer, an ethylene-octene polymer and combinations thereof.

According to some embodiments, the branched polypropylene has a melt index of 1 grams/10 minutes to 200 grams/10 minutes at 230° C./2.16 kg.

According to some embodiments, the polyolefin polymer has a density from 0.850 to 0.965 g/cm$^3$.

According to some embodiments, the composition has a viscosity from 100 to 3000 mPa·s and preferably from 100 to 1200 mPa·s at at least one temperature within the range of 120 to 205° C.

According to some embodiments, the composition further comprises a branched polyethylene, and/or an acid-modified polyolefin.

It is a second object of the invention to provide the use of the composition described above, as an adhesive for bonding two substrates together, or as a coating on the surface of a substrate, for example as an adhesive for a sealing label.

It is a further object of the invention to provide the use of a branched polypropylene for reducing stringing of a hot-melt adhesive composition.

According to some embodiments, the branched polypropylene is obtained by reaction of a polypropylene polymer with a conjugated diene.

According to some embodiments, the branched polypropylene is present at a content from 0.1 to 10%, and preferably from 0.5 to 5% by weight of the hot-melt adhesive composition.

According to some embodiments, the branched polypropylene is a homopolymer or a random copolymer comprising at least 50% by weight of propylene units.

Therefore, the invention provides a hot melt adhesive composition that can provide good quality products and that makes it possible to limit or avoid stringing and has excellent thermal stability without compromising the manufacturing process.

This is achieved by the presence of a branched polypropylene in the hot-melt adhesive composition. More particularly, the presence of a branched polypropylene makes it possible to limit or even avoid stringing in order to obtain good quality products.

In fact, when the branched polypropylene is in a finely dispersed state, stringing during high speed application can be reduced. Therefore, it is considered that the branched polypropylene blended in the hot melt adhesive composition reduces the cohesive strength of the dissolved material under conditions where stringing occurs (conditions where cooling and tension act).

In addition, due to the presence of branched polypropylene, the hot melt adhesive composition exhibits high resistance under high strain.

Furthermore, branched polypropylene has a low density and is difficult to sink to the bottom in a hot melt composition, therefore, the thermal stability of the hot melt adhesive composition is not deteriorated and clogging of the hose and nozzle is suppressed.

DESCRIPTION OF EMBODIMENTS

The invention will now be described in more detail without limitation in the following description.

Hot-Melt Adhesive Composition

The hot-melt adhesive composition of the present invention comprises at least one polyolefin polymer.

Olefins are unsaturated hydrocarbons containing at least one carbon-carbon double bond. The most typical monomers used in polyolefins are ethylene and α-olefins containing up to twenty carbon atoms. Olefin co-monomers may in particular include ethylene, propylene, butene, hexene, octene, and combinations thereof. Preferably the polyolefin may contain from 3 to 12 carbon atoms, more preferably from 4 to 10 carbon atoms, and most preferably from 4 to 8 carbon atoms.

More particularly, the α-olefin co-monomer may be selected from 1-butene, 1-pentene, 3-methyl-1-butene, 3-methyl-1-pentene, 1-hexene, 4-methyl-1-pentene, 1-dodecene, 3-methyl-1-hexene, 1-octene, and 1-decene.

Preferably, the polyolefin polymer of the present invention comprises ethylene monomers.

Other α-olefin co-monomers, preferably used with ethylene, may include one or more acrylic and/or methacrylic esters, preferably chosen from methyl acrylate, methyl methacrylate, ethyl acrylate, ethyl methacrylate, butyl acrylate, and butyl methacrylate.

According to other embodiments, the α-olefin co-monomer which can be used with ethylene is vinyl acetate.

The polyolefin polymer according to the invention may be a polyolefin polymer, or a blend of polyolefin polymers.

Thus, the polyolefin polymer may be a homopolymer or a copolymer based on ethylene and a $C_3$ to $C_{20}$ α-olefin co-monomer, or propylene and a $C_2$ to $C_{20}$ α-olefin comonomer, preferably obtained by metallocene-catalyzed polymerization. The polyolefin polymer, in particular if metallocene catalyzed, functions to provide the formulation cohesive strength. It does this by providing a substantially linear storage modulus (G") throughout the service temperature range of from 0° C. to 80° C.

Polyolefins according to the present invention may include ethylene polymers, such as polyethylene, or propylene polymers, such as high and low density polypropylene, and combinations thereof. According to some embodiments, the polyolefins of the present invention may include copolymers comprising ethylene and/or propylene monomers (the term "monomers" refers here to structural units derived from monomers, as is usual in the field) and other $C_2$-$C_{20}$ α-olefin co-monomers. Elastomeric polyolefins typically contain ethylene and propylene, together with $C_2$-$C_{10}$ olefin co-monomer units. Some particularly preferred polyolefin polymers are copolymers of ethylene with at least one other olefin monomer, referred to as "ethylene-based" because the predominant monomer by weight is ethylene, such as ethylene-propylene copolymers and ethylene-octene copolymers.

As noted above, a blend of one or more ethylene-based copolymers, or a blend of one or more propylene-based copolymers, or a blend of one or more ethylene-based copolymers with one or more propylene-based copolymers may be used in the present composition.

The α-olefin co-monomer content in the ethylene-based copolymer may in particular be at least 20% by weight and preferably in the range from 20 to 50% by weight, preferably from 25 to 50% by weight, more preferably from 30 to 50% by weight relative to the weight of the copolymer.

Examples of polyolefin polymers useful in this invention are available from Dow Chemical Co. under the trade name designation Affinity (metallocene catalyzed ethylene-octene copolymers), or from ExxonMobil Chemical Co. under the trade name designation VistamaXX (metallocene catalyzed propylene-ethylene copolymers), or from Westlake Chemical Company under the trade designation Epolene C-10 (which is a highly branched polyethylene polymer), among others.

A functionalized metallocene catalyzed polyolefin elastomer may also be employed as the polyolefin polymer. The term "functionalized" refers to polymers which are chemically modified so as to contain a functional group such as epoxy, silane, sulfonate, amide, and particularly anhydride, on the polymer backbone. Particularly preferred is a metallocene catalyzed polyolefin elastomer grafted with maleic anhydride (MAH) functionality. An example of these MAH grafted metallocene polymers includes Affinity® GA1000R from Dow Chemical Company. This polymer has a density of 0.878 grams/c.c., a DSC melting point of 68° C. and a Glass Transition Temperature of −58° C. via DSC. The Brookfield Viscosity at 177° C. is 13,000 centipoise (cP) and the Melt Index (ASTM 1238 with 190° C., 2.16 kg weight) is about 660 grams/10 minutes.

Other polyolefin polymer components used in the present hot-melt adhesive composition according to the present invention may also be an olefin block copolymer (OBC). An "olefin block copolymer" or "OBC" is a more recent development in the area of polyolefins. These are polyolefin polymers produced using a chain shuttling catalysis technology that produces a linear block structure of the monomers rather than a random polymer produced by Ziegler-Natta or traditional metallocene technology. At this time, they are manufactured by Dow Chemical under the trade name of Infuse®. The OBCs consist of crystallizable ethylene-octene blocks (hard) with very low co-monomer content and high melting point alternating with amorphous ethylene-octene blocks (soft) with high comonomer content and low glass transition temperature. This gives the polymer better elevated temperature resistance and elasticity compared to a typical metallocene random polymer of similar density. These polymers are described in WO 2006/101966 and others assigned to Dow Chemical Co.

According to preferred embodiments, the polyolefin polymer can be chosen from an ethylene-vinyl acetate polymer, a methyl methacrylate polymer, a vinyl acetate polymer, an ethylene-methyl methacrylate polymer, an ethylene-butyl acrylate polymer, an ethylene-octene polymer and combinations thereof.

The polyolefin polymer may have a density from 0.850 to 0.965 g/cm$^3$. To balance the modulus or flexibility and compatibility of the adhesive composition, the preferred density may be from 0.850 to 0.920 g/cm$^3$, more preferably from 0.855 to 0.910 g/cm$^3$, and most preferably from 0.860 to 0.890 g/cm$^3$. The density is measured according to the standard ASTM D-792-00.

The melt index of the polyolefin polymer is preferably greater than 10 grams/10 minutes at 190° C./2.16 kg using ASTM D-1238. More preferably, the melt index of the polyolefin polymer may be greater than 30 g/10 minutes, even more preferably greater than 100 g/10 minutes and most preferably greater than 500 g/10 minutes or even greater than 1000 g/10 minutes. According to some embodiments, the melt index of the polyolefin polymer is from 10 to 100 grams/10 minutes at 190° C./2.16 kg.

The polyolefin polymer may be present in the hot-melt adhesive composition at a content from 5 to 90%, preferably 10 to 50% by weight relative to the weight of the hot-melt adhesive composition.

For example, the polyolefin polymer may be present in the hot-melt adhesive composition at a content from 5 to 10%; or from 10 to 15%; or from 15 to 20%; or from 20 to 25%; or from 25 to 30%; or from 30 to 35%; or from 35 to 40%; or from 40 to 45% ; or from 45 to 50%; or from 50 to 55%; or from 55 to 60%; or from 60 to 65%; or from 65 to 70%; or from 70 to 75%; or from 75 to 80%; or from 80 to 85%; or from 85 to 90% by weight relative to the weight of the hot-melt adhesive composition.

The polyolefin polymer may have a melting point from 30 to 150° C., and preferably from 55 to 95° C.

The melting point can be measured using Differential scanning calorimetry (DSC).

The polyolefin polymer may have a glass transition temperature from −75 to −15° C., and preferably from −60 to −35° C.

The glass transition temperature can be measured using differential scanning calorimeter (DSC) or differential thermal analysis (DTA) according to standard ASTM D 3418-82.

The hot-melt composition of the present invention further comprises at least one branched polypropylene, in addition to the polyolefin polymer described above (which thus is not and does not comprise a branched polypropylene). By "branched polypropylene" is meant a linear polypropylene which has been modified so as to comprise one or more secondary polymer chains linked to the primary polypropylene backbone. Such branched polypropylene can be obtained by the reaction of a linear polypropylene with a conjugated diene. In this case, the secondary chains of the branched polypropylene derive from the conjugated dienes. Preferably, this reaction may be carried out in the presence of an initiator, preferably a radical-polymerization initiator.

In order to obtain such branched polypropylene, various methods have been developed. Such cross-linking methods include a method of irradiating an electron beam after polymerization, a method of using a peroxide, a peroxide and a crosslinking initiator, and a method of introducing a long chain branch which includes grafting a radical polymerizable monomer onto polypropylene. Recently, a macromer copolymerization method mainly using a metallocene catalyst has been proposed. The metallocene catalyst is a transition metal compound having at least one conjugated five-membered ring ligand in a broad sense, and a ligand having a crosslinked structure is generally used for propylene polymerization.

When a macromer copolymerization method using a metallocene catalyst is carried out, for example, in the first stage of polymerization (hereinafter also referred to as a macromer synthesis step), a propylene macromer having a vinyl structure at a terminal end is produced using a specific catalyst and specific polymerization conditions. Then, in the second stage of polymerization (hereinafter also referred to as a macromer copolymerization process), copolymerization with propylene under a specific catalyst and specific polymerization conditions eliminates high-order crosslinking. A method has been devised (hereinafter also referred to as macromer copolymerization method) that is excellent in recyclability and has no concern about gel formation for improving melt tension.

In contrast to the multistage polymerization method described above, a homopolymerization method (in situ macromer generation method) in which a macromer synthesis step and a macromer copolymerization step are simultaneously performed has been devised, including at least two kinds of transition metal compounds of the periodic table of special indenyl type metallocene and azulenyl type metallocene (however, the molar ratio of indenyl type metallocene is 0.30 or more and 0.99 or less).

The branched polypropylene may have a strain hardening degree ($\lambda$max) equal to or higher than 2.0 in the measurement of elongational viscosity, notably when the propylene polymerization is carried out in the presence of a catalyst. The strain hardening degree may be measured according to the method described in the article "*Rheological properties of low-density polyethylenes produced by tubular and vessel processes*" of M. Yamaguchi et al. (Polymer, 2001, vol.42, p.8663).

The strain hardening degree is an index representing the nonlinearity of elongational viscosity, and it is usually said that this value increases as the molecular entanglement increases. Molecular entanglement is affected by the amount of branching and the length of the branched chain.

Therefore, the greater the amount of branching and the length of branching, the greater the degree of strain hardening.

Preferable measurement methods and measuring instruments include the following:

Measurement temperature: 180° C.;

Strain rate: 0.1/sec.

In a method 1, a test piece is created by press molding to produce a sheet of 18 mm×10 mm, thickness 0.7 mm.

In a method 2, a test piece is created at 180° C. using a Toyo Seiki Capillograph. Extruded strands are produced at a speed of 10 to 50 mm/min using an orifice with an inner diameter of 3 mm.

It is preferable for convenience to use the measuring method 1 for polymers having a low molecular weight and the measuring method 2 for polymers having a high molecular weight.

Figure 1:
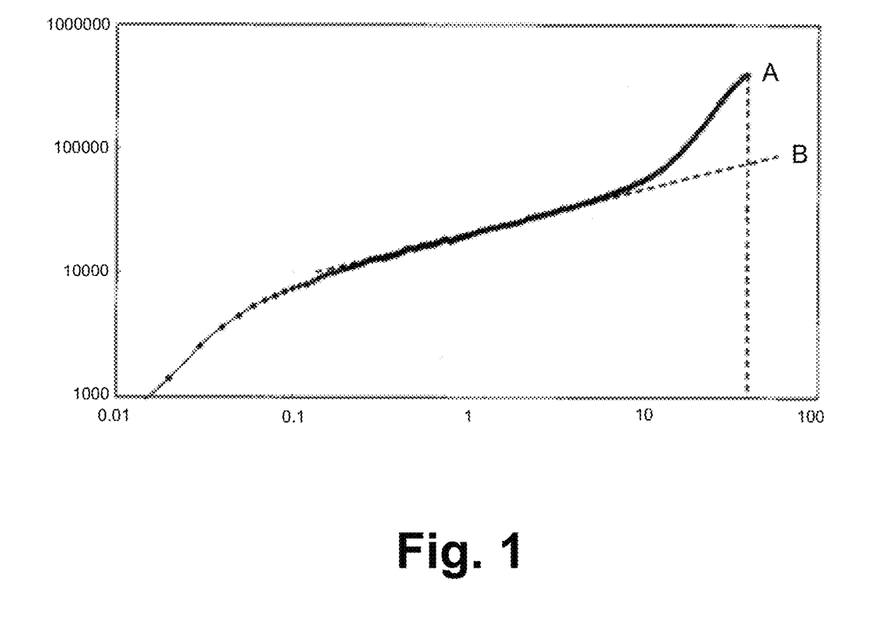
FIG. 1 shows an exemplary plot for determining the strain hardening degree of a polymer. Elongational viscosity (Pa.s) can be read on the Y-axis and time (seconds) can be read on the X-axis.

The elongational viscosity is plotted at a strain rate of 0.1/sec on the horizontal axis, with the time t (second) on the horizontal axis and the elongational viscosity ηE (Pa.second) on the vertical axis as illustrated in FIG. 1. On the logarithmic graph, the viscosity immediately before strain hardening is approximated by a straight line, the maximum value (ηmax or A in FIG. 1) of the extensional viscosity ηE until the amount of strain becomes 4.0 is obtained, and on the approximate straight line up to that time a viscosity ηlin (B in FIG. 1) is plotted. ηmax/ηlin is defined as λmax and is used as an index of strain hardening degree.

By "strain hardening" is meant the strengthening of a material during large strain deformation.

The linear polypropylene may be a homopolymer or a copolymer, preferably a random copolymer. In case the linear polypropylene is a copolymer, it may preferably comprise more than 50% of propylene units, preferably more than 60% of propylene units, preferably more than 70% of propylene units, and even more preferably more than 80% of propylene units, by weight. The fact that the copolymer may comprise more than 50% of propylene units makes it possible to achieve a desired chemical resistance as well as a desired rigidity and crystallinity.

Therefore, apart from propylene units, the copolymer may also comprise at least one α-olefin unit having from 2 to 20 and preferably from 3 to 10 carbon atoms. Such α-olefin may be chosen from butene-1, isobutene, pentene-1, 3-methyl-butene-1, hexene-1, 3-methyl-pentene-1, 4-methyl-pentene-1,3,4-dimethyl-butene-1, heptene-1, 3-methyl-hexene-1, octene-1, decene-1, and α-olefins having 4 to 12 carbon atoms.

Specific examples of cyclic olefins include cyclopentene, norbornene, 1,4,5,8-dimethano-1,2,3,4,4a,8,8a-6-octahydronaphthalene and the like. Alternatively, apart from the propylene units, the copolymer may comprise monomers other than α-olefins such as diene monomers, and/or vinyl monomers. Such monomers are preferable because they are easily copolymerized with propylene and are inexpensive.

Specific examples of diene monomers include, for example, 5-methylene-2-norbornene, 5-ethylidene-2-norbornene, 1,4-hexadiene, methyl-1,4-hexadiene, 7-methyl-1,6-octadiene.

Specific examples of vinyl monomers include, for example, vinyl chloride, vinylidene chloride, acrylonitrile, vinyl acetate, acrylic acid, methacrylic acid, maleic acid, ethyl acrylate, butyl acrylate, methyl methacrylate, and maleic anhydride, styrene, methyl styrene, divinylbenzene and the like.

The melt flow rate of the linear polypropylene is preferably in the range of 0.01 to 20 grams/10 minutes under the condition of 2.16 kg at 230° C. according to the measurement method of JIS K7210.

When the melt flow rate is larger than the above range, the melt viscosity of the modified polypropylene resin tends to be too low, and the effect of improving the moldability by modification tends to be insufficient. On the other hand, when the melt flow rate is smaller than the above range, the melt viscosity since it becomes too high, it tends to be difficult to mold.

As mentioned above, the linear polypropylene may react with at least one conjugated diene in order to provide the branched polypropylene. This diene may be chosen from butadiene, isoprene, 1,3-heptadiene, 2,3-dimethyl butadiene, 2,5-dimethyl-2,4-hexadiene, as well as their combinations.

The conjugated diene may be used in amount from 0.01 to 5% by weight relative to the linear polypropylene, preferably from 0.05 to 2% by weight. If the addition amount of the conjugated diene is too low, the modification may be insufficient, and if it is too high, fluidity may be too low.

The reaction preferably takes place in the presence of an initiator, preferably a radical polymerization initiator such as a peroxide or an azo-compound. Specific examples include ketone peroxides, peroxyketals, hydroxyperoxides, dialkylperoxides, and diacid organic peroxides such as ruperoxides, peroxycarbonates and peroxyesters.

The initiator may be used in amount from 0.05 to 10%, and preferably from 0.2 to 5% by weight relative to the linear polypropylene. If the addition amount of the initiator is too low, the modification may be insufficient, and if it is too high, molecular chain scission may take precedence over polymer modification.

The method for manufacturing the branched polypropylene can be found on patent JP2017171788. More particularly, there are no particular restrictions on the order and method of mixing and kneading (stirring) the linear polypropylene, the conjugated diene compound, and the radical polymerization initiator in order to obtain the branched polypropylene. The linear polypropylene, the conjugated diene compound, and the radical polymerization initiator may be mixed and then melt-kneaded (stirred), or after the linear polypropylene is melt-kneaded (stirred), the conjugated diene compound or radical initiator may be simultaneously mixed. Alternatively, they may be mixed separately, collectively or divided. The temperature of the kneading (stirring) machine may be from 130 to 300° C. This temperature range is preferable as the linear polypropylene melts and does not thermally decompose. The kneading (stirring) time may generally be from 1 to 60 minutes.

In this way, a branched polypropylene can be produced. There is no restriction in the shape and magnitude/size of branched polypropylene. A pellet form may be appropriate.

Therefore, as for the linear polypropylene, the branched polypropylene obtained may be a homopolymer or a copolymer. In case, the branched polypropylene is a copolymer, it may preferably comprise more than 50% of propylene units, preferably more than 60% of propylene units, preferably more than 70% of propylene units, and even more preferably more than 80% of propylene units.

The melt index of the branched polypropylene is preferably from 1 grams/10 minutes to 200 grams/10 minutes at 230° C./2.16 kg using JIS K7210. More preferably, the melt index of the branched polypropylene may be from 1 grams/10 minutes to 100 grams/10 minutes and even more preferably from 5 grams/10 minutes to 80 grams/10 minutes, in order to achieve optimal manufacturing solubility and heat stability.

According to some embodiments, the hot-melt composition of the present invention comprises one branched polypropylene.

According to other embodiments, the hot-melt composition of the present invention comprises a mixture of two or more branched polypropylenes.

The branched polypropylene is present in the hot-melt composition at a content from 0.1 to 10%, and preferably from 0.5 to 5% by weight relative to the weight of the hot-melt adhesive composition.

For example, the branched polypropylene may be present in the hot-melt composition ata content from 0.1 to 0.5%; or from 0.5 to 1%; or from 1 to 1.5%; or from 1.5 to 2%; or from 2 to 2.5%; or from 2.5 to 3%; or from 3 to 3.5%; or from 3.5 to 4%; or from 4 to 4.5%; or from 4.5 to 5%; or from 5 to 5.5%; or from 5.5 to 6%; or from 6 to 6.5%; or from 6.5 to 7%; or from 7 to 7.5%; or from 7.5 to 8%; or from 8 to 8.5%; or from 8.5 to 9%; or from 9 to 9.5%; or from 9.5 to 10% by weight relative to the weight of the hot-melt adhesive composition.

Apart from the polyolefin polymer and the branched polypropylene, the hot-melt adhesive composition comprises at least one tackifying resin.

The tackifying resin is present in the hot-melt adhesive composition at a content of 0.1 to 60% by weight. Preferably, the tackifying resin is present in the hot-melt adhesive composition at a content from 1 to 55% by weight, more preferably from 5 to 52% by weight, and even more preferably from 10 to 52% by weight relative to the weight hot-melt adhesive composition.

The tackifying resins or tackifiers which are used in the hot-melt adhesives of the present invention are those which are compatible with the polymers and extend adhesive properties and improve specific adhesion. As used herein, the term "tackifying resin" or "tackifies" include:

(a) Aliphatic and cycloaliphatic petroleum hydrocarbon resins having Ring and Ball softening points from 95° C. to 160° C. as determined by ASTM method E28-58T, the latter resins resulting from the polymerization of monomers consisting primarily of aliphatic and/or cycloaliphatic olefins and diolefins; also included are the hydrogenated aliphatic and cycloaliphatic petroleum hydrocarbon resins, examples of such commercially available resins based on a C5 olefin fraction of this type are Piccotac 95 tackifying resin sold by Hercules Corp. and Escorez 1310LC sold by Exxon-Mobil Chemical Company;

(b) Aromatic petroleum hydrocarbon resins and the hydrogenated derivatives thereof;

(c) Aliphatic/aromatic petroleum derived hydrocarbon resins and the hydrogenated derivatives thereof;

(d) Aromatic modified cycloaliphatic resins and the hydrogenated derivatives thereof;

(e) Polyterpene resins having a softening point from 95° C. to 140° C. the latter polyterpene resins generally resulting from the polymerization of terpene hydrocarbons, such as the mono-terpene known as pinene, in the presence of Friedel-Crafts catalysts at moderately low temperatures; the hydrogenated polyterpene resins are also included;

(f) Copolymers and terpolymers of natural terpenes, e.g. styrene/terpene, α-methyl styrene/terpene and vinyl toluene/terpene;

(g) Natural and modified rosin such as, for example, gun rosin, wood rosin, tall-oil rosin, distilled rosin, hydrogenated rosin, dimerized rosin and polymerized rosin;

(h) Glycerol and pentaerythritol esters of natural and modified rosin, such as, for example, the glycerol ester of pale wood rosin, the glycerol ester of hydrogenated rosin, the glycerol ester of polymerized rosin, the pentaerythritol ester of pale wood rosin, the pentaerythritol ester of hydrogenated rosin, the pentaerythritol ester of tall-oil rosin, and the phenolic modified pentaerythritol ester of rosin;

(i) Phenolic-modified terpene resins such as for example, the resin product resulting from the condensation in an acidic medium of a terpene and a phenol.

Mixtures of two or more of the above described tackifying resins may also be used.

Tackifying resins which are useful for the present invention can include polar tackifying resins. However, the choice of available polar tackifying resins is limited in view of the fact that many of the polar resins appear only partially compatible with polyolefin polymers.

Alternatively, the tackifying resins can be selected from any of the nonpolar types, which are commercially available. One class of preferred resins are aliphatic petroleum hydrocarbon resins, examples of which are based on C5 olefins. Most preferred are nonpolar products which are hydrogenated di-cyclo-pentadiene (DCPD) based or aromatically modified derivatives thereof with softening points above 95° C. Examples of such resins are Escorez 5340, Escorez 5400 and Escorez 5600 sold by ExxonMobil Chemical company.

Preferably, the tackifying resin should have a Ring and Ball softening point (measured by ASTM E28) of at least 95° C. and preferably from 95° C. to 140° C. In general, the tackifying resin should be substantially aliphatic to insure compatibility between the resin and the polyolefin polymers.

In addition, a plasticizer is preferably present in the hot-melt adhesive composition. More particularly, a solid or liquid plasticizer can be present in the composition of the present invention.

The plasticizer may be present in the hot-melt adhesive composition at a content from 0.1 to 30% by weight relative to the weight of the composition. Preferably, the plasticizer is present in the hot-melt adhesive composition at a content from 0.5 to 20% by weight, more preferably from 1 to 10% by weight, and even more preferably from 1 to 5% by weight relative to the weight of the hot-melt adhesive composition.

The purpose of the plasticizer is to provide a desired viscosity control and to impart flexibility. A suitable plasticizer may be selected from the group which includes the usual plasticizing oils, such as mineral oils, but also olefin oligomers and low molecular weight polymers, as well as vegetable and animal oils and derivatives of such oils. The petroleum derived oils which may be employed are relatively high boiling materials containing only a minor proportion of aromatic hydrocarbons. The oligomers may be polypropylenes, polybutenes, hydrogenated polyisoprenes, hydrogenated polybutadienes, or the like having an average molecular weight between 350 and 10,000. Suitable vegetable and animal oils include glycerol esters of the usual fatty acids and polymerization products thereof. The plasticizers that find usefulness in the present invention can be any number of different plasticizers but the inventors have discovered that the mineral oils and liquid polybutenes having average molecular weight less than 5,000 are particularly advantageous.

Typically, plasticizers are used to lower the viscosity of the overall hot-melt adhesive composition without substantially decreasing the adhesive strength and/or service temperature of the adhesive composition as well as to extend the open time and to improve flexibility of the composition The composition according to the present invention also preferably includes at least one stabilizer. The stabilizer may be present in the hot-melt adhesive composition at a content from 0.1 to 5% and preferably from 0.5 to 3% by weight relative to the weight of the composition. The stabilizers which are useful in the hot-melt adhesive composition of the present invention are incorporated to help protect the polymers noted above, and thereby the total adhesive system from the effects of thermal and oxidative degradation which normally occurs during the manufacture and application of the adhesive, as well as in the ordinary exposure of the final product to the ambient environment.

Among the applicable stabilizers are high molecular weight hindered phenols and multifunction phenols, such as sulfur and phosphorous-containing phenols. Hindered phenols are well known to those skilled in the art and may be characterized as phenolic compounds that also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus providing the phenolic compound with its stabilizing properties. Representative hindered phenols include:

1,3,5-trimethyl-2,4,6-tris(3-5-di-tert-butyl-4-hydroxybenzyl) benzene; pentaerythritol tetrakis-3(3,5-di-tert-butyl-4-hydroxyphenyl) propionate; n-octadecyl-3(3,5-di-tert-butyl-4-hydroxyphenyl) propionate, 4.4'-methylenebis(4-methyl-6-tert-butylphenol); 2,6-di-tert-butylphenol; 6-(4-hydroxyphenoxy)-2,4-bis (n-octylthio)-1,3,5-triazine; 2,3,6-tris(4-hydroxy-3,5-di-tert-butyl-phenoxy)-1,3,5-triazine; di-n-octadecyl -3,5-di-tert-butyl-4-hydroxybenzylphosphonate; 2-(n-octyl-thio)ethyl-3,5-di-tert-butyl -4-hydroxybenzoate and sorbitol hexa-3(3,5-di-tert-butyl-4-hydroxy-phenyl)propionate.

Especially preferred as a stabilizer is pentaerythritol tetrakis-3(3,5-di-tert-butyl-4-hydroxyphenol) propionate.

The performance of these stabilizers may be further enhanced by utilizing, in conjunction therewith; (1) synergists such as, for example, thiodipropionate esters and phosphites; examples of these include dialuryl thiodipropionate (DLTDP) and tris(nonylphenyl)phosphite (TNPP), respectively; and (2) chelating agents and metal deactivators as, for example, ethylenediaminetetraacetic acid, slats thereof and disalicylalpropylenediimine.

The composition according to the present invention may further include at least one wax. The wax may be present in the hot-melt adhesive composition at a content from 0 to 30% and preferably from 0.5 to 3% by weight relative to the weight of the composition.

The presence of the wax makes it possible to reduce the melt viscosity of the hot-melt adhesives without appreciably decreasing their adhesive bonding characteristics. These waxes are also used to reduce the open time, or set-up time of the composition without affecting the temperature performance.

Among the useful wax materials are:
(1) low molecular weight, that is, number average molecular weight (Mn) from 100 to 6000 g/mol, polyethylene wax having a hardness value, as determined by ASTM method D-1321, from 0.1 to 120 and ASTM softening points from 65° C. to 140° C.;
(2) petroleum waxes such as paraffin wax having a melting point from 50° C. to 80° C. and microcrystalline wax having a melting point from 55° C. to 100° C., the latter melting points being determined by ASTM method D127-60;
(3) metallocene catalyzed propylene-based wax like those commercialized by Clariant under the name "Licocene";
(4) metallocene catalyzed wax or single-site catalyzed wax like for example those described in U.S. Pat. No 4,914,253, U.S. Pat. No. 6,319,979, WO 97/33921 or WO 98/03603,
(5) synthetic waxes made by polymerizing carbon monoxide and hydrogen such as Fischer-Tropsch wax; and
(6) polyolefin waxes. As used herein, the term "polyolefin wax" refers to those polymeric or long-chain entities comprised of olefinic monomer units. These materials are commercially available from Westlake Chemical Co. under the trade name "Epolene".

Preferably, the wax materials used have a Ring and Ball softening point from 93° C. to 177° C. As should be understood, each of these waxes is solid at room temperature. Other useful substances include hydrogenated animal, fish and vegetable fats and oils such as hydrogenated tallow, lard, soy oil, cottonseed oil, castor oil, menhadin oil, cod liver oil, and the like, and which are solid at ambient temperature by virtue of their being hydrogenated, have also been found to be useful with respect to functioning as a wax material equivalent. These hydrogenated materials are often referred to in the adhesives industry as "animal or vegetable waxes".

According to some preferred embodiments, the hot-melt adhesive composition of the present invention may further comprise at least one styrenic block copolymer. There are many different types of styrenic block copolymers available today in the marketplace. They are available in a number of different chemical types and structure types. Examples of the styrenic block copolymers (SBC) that may be used in the hot-melt adhesive composition of the present invention include styrene-butadiene (SB), styrene-butadiene-styrene (SBS), styrene-isoprene-styrene (SIS), styrene-isoprene (SI), styrene-isoprene-butadiene-styrene (SIBS), styrene-ethylene butylene-styrene (SEBS), styrene-ethylene-butylene (SEB), styrene-ethylene-propylene-styrene (SEPS), styrene-ethylene propylene (SEP) and styrene-ethylene-ethylene-propylene-styrene (SEEPS or hydrogenated SIBS).

For purposes of the present invention, it is preferred that the styrene endblocks of the copolymer comprise about 10% to about 40% by weight of the copolymer, the midblocks of the styrenic block copolymer be hydrogenated, and the copolymer have a melt index less than about from 0 to 50 grams/10 minutes at 230° C./5 kg. Preferred SBC polymers are thus styrene-ethylene butylene-styrene (SEBS), styrene-ethylene-butylene (SEB) styrene-ethylene-propylene-styrene (SEPS), styrene-ethylene-propylene (SEP) and styrene-ethylene-ethylene-propylene-styrene (SEEPS or hydrogenated SIBS). Particularly preferred polymers are the SEBS and SEEPS grades.

Commercial available styrenic block copolymers useful in the present composition include the Kraton G series block copolymers, available from Shell Chemical Company (Houston, Tex.), and Septon 2000, 4000, 8000 grades of block copolymers, available from Kuraray Co. Ltd. Within the range of SEBS polymers, particularly preferred is Kraton G1652M, which is manufactured by Kraton Performance Polymers. Other grades that are suitable include Kraton G1650, Kraton G1643 and Kraton G1657.

According to some embodiments, the styrenic block copolymer may be present in the hot-melt adhesive composition at a content from 0.1 to 30%, and preferably from 0.1 to 5% by weight relative to the weight of the hot-melt adhesive composition.

According to some preferred embodiments, the hot-melt adhesive composition may also comprise a branched polyethylene. By "branched polyethylene" is meant a linear polyethylene which has been modified so as to comprise one or more secondary polymer chains linked to the primary polyethylene backbone. In this case, the secondary chains of the branched polyethylene may derive from conjugated dienes. Such branched polyethylene can be obtained in the same way as the branched polypropylene, as described above.

The branched polyethylene may be present in the hot-melt adhesive composition at a content from 0.05 to 10% and preferably from 0.5 to 5% by weight relative to the weight of the hot-melt adhesive composition. For example, the branched polyethylene may be present in the hot-melt adhesive composition at a content from 0.05 to 0.1%; or from 0.1 to 0.5%, or from 0.5 to 1%; or from 1 to 1.5%; or from 1.5 to 2%; or from 2 to 2.5%; or from 2.5 to 3%; or from 3 to 3.5%; or from 3.5 to 4%; or from 4 to 4.5%; or from 4.5 to 5%; or from 5 to 5.5%; or from 5.5 to 6%; or from 6 to 6.5%; or from 6.5 to 7%; or from 7 to 7.5%; or from 7.5 to 8%; or from 8 to 8.5%; or from 8.5 to 9%; or from 9 to 9.5%; or from 9.5 to 10% by weight relative to the weight of the hot-melt adhesive composition.

Therefore, the branched polyethylene obtained may be a homopolymer or a copolymer. In case, the branched polyethylene is a copolymer, it may preferably comprise more than 50% of ethylene units, preferably more than 60% of ethylene units, preferably more than 70% of ethylene units, and more preferably more than 80% of ethylene units, by weight.

The branched polyethylene may be a polyethylene produced by a high-pressure process; it may have an unsaturated ester content of 0-8 wt. % and a melt flow rate of 0.01-400 grams/10 minutes at 190° C. under a load of 2160 g.

Furthermore, the hot-melt adhesive composition may comprise an acid-modified polyolefin. By "acid-modified polyolefin" is meant a polyolefin which is modified by an unsaturated polycarboxylic acid, anhydride or ester, therefore comprising one or more acidic groups.

The polyolefin may be as described above with respect to the "polyolefin polymer" component of the composition.

The unsaturated polycarboxylic acid, anhydride or ester used for modification of the polyolefin is not particularly limited, but examples of the dicarboxylic acid may include maleic acid, fumaric acid, itaconic acid, citraconic acid, and the like. Examples of tricarboxylic acid may include trimellitic acid.

Preferably, the polyolefin modified with an unsaturated polycarboxylic acid, anhydride, or ester includes a polyolefin made using an olefin such as ethylene, propylene and butylene as a monomer, and at least the unsaturated polycarboxylic acid described above. It may also be modified with an anhydride or an ester, and may be further modified with other monomers. For example, the polyolefin may be modified with an acrylic ester, a methacrylic ester, an ethyl acrylic ester, a vinyl acetate, or a vinyl chloride.

The unsaturated polycarboxylic acid, anhydride or ester may be added to the olefin before polymerization, or to the polyolefin after polymerization. Examples of suitable manufacturing methods include addition and graft polymerization. The unsaturated polycarboxylic acid, anhydride or ester may be blended at a ratio from 0.2% to 3%, preferably from 0.2 to 1%, more preferably from 0.25 to 1% by weight with respect to the weight of the polyolefin.

The acid-modified polyolefin preferably has an unsaturated polycarboxylic acid, anhydride or ester modification rate from 0.2 to 50%, and preferably from 0.3 to 10% by weight. When the modification rate is less than 0.2% by weight, the stringing resistance may be lowered. On the other hand, when the modification rate exceeds 50% by weight, the compatibility with the unmodified polyolefin is deteriorated, and the heat stability may be lowered.

The acid-modified polyolefin may be present in the hot-melt adhesive composition at an amount from 0.1 to 10%, and preferably from 0.1 to 5% by weight relative to the weight of the hot-melt adhesive composition According to some embodiments, other optional auxiliary additives may be incorporated in the hot-melt adhesive composition, in order to modify one or more physical properties of the composition. These auxiliary additives may be present in the hot-melt adhesive composition at a total amount from 0.01 to 3% by weight relative to the weight of the composition.

Such additives may include, for example, inert colorants such as titanium dioxide as well as fillers, surfactants, other types of polymers, crosslinking agents, nucleating agents, reactive compounds, fire-retardant mineral or organic agents, ultraviolet (UV) or infrared (IR) light absorbing agents, and UV or IR fluorescing agents. Typical fillers include talc, calcium carbonate, clay, silica, mica, wollastonite, feldspar, aluminum silicate, alumina, hydrated alumina. glass microspheres, ceramic microspheres, thermoplastic microspheres, baryte and wood flour. These optional auxiliary additives are well known in this art.

The hot-melt adhesive composition of the present invention may be formulated by using any of the mixing techniques known in the art. A representative example involves placing all the components except the polymers in a jacketed mixing kettle, such as a jacketed heavy duty mixer of the Baker-Perkins or Day type, equipped with a rotor and thereafter raising the temperature of the mixture to a range from 120° C. to 205° C. in order to melt the contents. It should be understood that the precise temperature to be used in this step would depend on the melting points of the particular ingredients. The polymers are subsequently introduced into the kettle under agitation and the mixing is continued until a consistent and uniform mixture is formed. The content of the kettle may be protected with inert gas such as carbon dioxide or nitrogen during the entire mixing process, and vacuum may be applied to remove any entrapped gases, particularly air.

The viscosity of the hot-melt adhesive composition may be from 100 to 3000 mPa·s, and preferably from 100 to 1200 mPa·s. The viscosity is measured using a Brookfield Thermosel System viscosimeter according to the method JIS K6862.

Use

The invention also relates to the use of the hot-melt adhesive composition as described above, for coating a surface.

The surface to be coated may comprise nonwoven fabric, tissue, absorbent fluff, super absorbent polymer (SAP), composite material, plastics which may be elastomeric or non-elastomeric, for example styrenic block copolymers (SBC), polyurethane, and polyolefin, and any mixture thereof. In particular embodiments, the surface is a nonwoven surface. More preferably, the surface comprises polypropylene (PP), polyethylene (PE), polyethylene terephthalate (PET), cotton, bamboo, silk and/or polylactic acid.

The invention also relates to the use of the hot-melt adhesive composition as described above, for bonding two substrates.

In this case, the process of manufacturing an assembly product (or laminate) may comprise:
- a step (i) of heating the hot-melt adhesive composition according to the invention, e.g. at a temperature ranging from 130° C. to 180° C., for at least a period of time long enough to render the hot melt adhesive composition liquid enough to be applied on a substrate (for example at least two hours), then
- a step (ii) of coating said composition on a first substrate, then
- a step (iii) of putting into contact the coated surface of the first substrate with the surface of a second substrate, so as to form an adhesive joint bonding the two substrates.

The substrates may be different or of same nature, with various forms (layer or film, strands, fluff).

Preferably, each substrate may be chosen independently from one another among nonwoven fabric, tissue, absorbent fluff, super absorbent polymer (SAP), composite material, plastics which may be elastomeric or non-elastomeric, and which may be chosen for example from styrenic block copolymers (SBC), polyurethane, and polyolefin, and any mixture thereof.

The composition according to the invention may be coated or applied with a variety of application techniques known in the art, which include contact type application (such as slot die coating) and non-contact type application (such as spraying or fiberization).

The presence of the branched polypropylene in the hot-melt adhesive composition makes it possible to limit or even avoid stringing during the application of the composition on the surface of the substrate. This makes it possible to obtain products of good quality without causing issues during the manufacturing process.

The presence of the branched polypropylene in the hot-melt adhesive composition may further impart certain die cut properties to the hot-melt adhesive composition. A hot-melt adhesive having good die cut properties should not stretch and should be easily cut when pressed by a blade.

EXAMPLES

The following examples illustrate the invention without limiting it.

Thermal Stability 150 g of a hot melt adhesive composition is collected in a 250 mL sample bottle and heated at 180° C. for 96 hours. The state at this time is observed, and the heat stability of the hot melt is evaluated according to the following criteria.
Good: No change in state
Bad: Resin bottom accumulation Anti-Stringing Test Using a Nordson hot melt applicator 3500V, the hot melt adhesive composition was melted at 180° C. and then was discharged horizontally for a certain period of time. The diameter of the nozzle was 0.35 mm/2 orifices and the temperature of the nozzle is 180° C. The temperature of the hose and the tank comprising the hot-melt adhesive composition is also 180° C. The discharge interval was ON 0.1 seconds. OFF 1.5 seconds.

Figure 2:
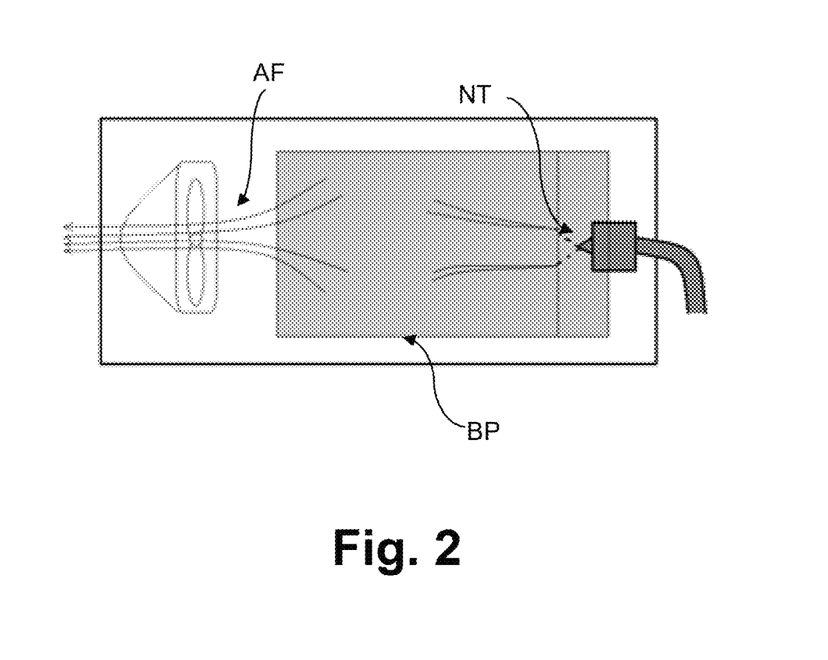
FIG. 2 illustrates in a schematic manner the anti-stringing test performed in the context of the invention.

As illustrated in FIG. 2, black paper (BP) was placed at a distance of 10 cm away from the nozzle tip (NT).

The discharge time of the hot-melt adhesive composition was 10 minutes and the discharge pressure was 0.25 MPa.

An airflow (AF) was generated near the nozzle in a direction parallel to the black paper and with a wind speed of 1.8 to 2 m/s.

The environmental temperature was from 20 to 25° C.

The state of the thread spun from the hot melt adhesive adhering to the black paper was observed, according to the following rating:
Excellent: No stringing is generated
Good: Stringing length of 10 mm or less
Fair: Stringing length of 50 mm or less
Bad: Stringing length of 100 mm to 200 mm
Worst: Stringing length of 200 mm or more Example 1

Six compositions where prepared (A, B, C, D, E, F) comprising some or all of the following compounds:
P1: an ethylene/1-octene copolymer having a melt index of 500 g/10 minutes at 190° C./2.16 kg;
P2: an ethylene/1-octene copolymer having a melt index of 1 000 g/10 minutes at 190° C./2.16 kg;
R1: a tackifier resin which is a fully hydrogenated C5 aromatic petroleum resin;
R2: a tackifier resin which is a partially hydrogenated C5 aromatic petroleum resin;
W1: a wax which is a Fischer-Tropsch wax;
W2: a wax which is a paraffin wax;
O1: an oil which a paraffin process oil;
P3: a branched polypropylene having a melt index of 60 g/10 minutes at 230° C./2.16 kg;
P4: a linear polypropylene having a melt index of 50 g/10 minutes at 230° C./2.16 kg;
P5: a hydrogenated styrene butadiene block copolymer (SEBS), (S/EB Ratio 18/82, Shore-A 39, MFR 15 g/10 min at 230° C./2.16 kg);
A1: an antioxidant.

The compositions A to F are illustrated on the Table below:

| Compositions | A | B | C | D | E | F |
|---|---|---|---|---|---|---|
| P1 | 20 | 20 | 20 | 20 | — | — |
| P2 | 20 | 20 | 20 | 20 | 40 | 40 |
| R1 | 30 | 30 | 30 | 30 | 30 | 30 |
| R2 | 10 | 10 | 10 | 10 | — | — |
| W1 | 20 | 20 | 20 | 20 | — | — |
| W2 | — | — | — | — | 10 | 10 |
| O1 | — | — | — | — | 20 | 20 |
| P3 | 1 | 3 | — | — | 1 | — |
| P4 | — | — | — | 3 | — | — |
| P5 | — | — | — | — | 5 | 5 |
| A1 | 0.2 | 0.2 | 0.2 | 0.2 | 0.2 | 0.2 |
| Anti-stringing performance | Good | Excellent | Worst | Bad | Good | Worst |
| Thermal stability at 180° C. | Good | Good | Good | Good | Good | Good |

The proportions described in the table above are parts by weight.

As can be seen from the table above, the presence of a branched polypropylene (compositions A, B, E) makes it possible to obtain a hot-melt adhesive composition that presents at the same time a good anti-stringing performance and a good thermal stability. On the contrary, when the hot-melt adhesive composition is devoid of a branched polypropylene (even when a linear polypropylene is present) (compositions C, D, F) the hot-melt adhesive composition does not present both a good anti-stringing performance and a good thermal stability. In fact, generally, when a styrene elastomer (SEBS) is present in the composition, stringing is more likely to occur (composition F). Thus, even in this case, the presence of branched polypropylene makes it possible not only to reduce stringing of the composition but also to obtain a thermally stable composition (composition E).

Example 2

Four compositions where prepared (G, H, I, J) comprising some or all of the following compounds:
P6: an ethylene/vinyl acetate copolymer and having a melt index of 400 g/10 minutes at 190° C./2.16 kg;
R1: a tackifier resin which is a fully hydrogenated C5 aromatic petroleum resin;
W1: a wax which is a Fischer-Tropsch wax;
P3: a branched polypropylene having a melt index of 60 g/10 minutes at 230° C./2.16 kg;
P7: a linear polypropylene homopolymer;
P8: a low-density linear polyethylene;
A1: an antioxidant.

The compositions G to J are illustrated on the Table below:

| Compositions | G | H | I | J |
| --- | --- | --- | --- | --- |
| P6 | 40 | 40 | 40 | 40 |
| R1 | 35 | 35 | 35 | 35 |
| W1 | 25 | 25 | 25 | 25 |
| P3 | 1 | 0.5 | — | — |
| P7 | — | — | — | 1 |
| P8 | — | 0.5 | — | 0.5 |
| A1 | 0.2 | 0.2 | 0.2 | 0.2 |
| Anti-stringing performance | Good | Good | Worst | Bad |
| Thermal stability at 180° C. | Good | Good | Good | Good |

The proportions described in the table above are parts by weight.

As can be seen from the table above, the presence of a branched polypropylene (compositions G, H) makes it possible to obtain a hot-melt adhesive composition that presents at the same time a good anti-stringing performance and a good thermal stability. On the contrary, when the hot-melt adhesive composition is devoid of a branched polypropylene (even when a linear polypropylene is present) (compositions I, J) the hot-melt adhesive composition does not present both a good anti-stringing performance and a good thermal stability.

The invention claimed is:

1. A hot-melt adhesive composition, comprising:
at least one polyolefin polymer at a content from 5 to 90% by weight;
at least one branched polypropylene at a content from 0.1 to 10% by weight;
at least one tackifying resin at a content from 0.1 to 60% by weight;
optionally, at least one styrene block copolymer from 0 to 30% by weight;
optionally, at least one plasticizer at a content from 0 to 30% by weight;
optionally, at least one stabilizer at a content from 0 to 5% by weight; and
optionally, at least one wax at a content from 0 to 30% by weight.

2. The composition of claim 1, wherein the branched polypropylene is a homopolymer.

3. The composition according to claim 1, wherein the branched polypropylene is present at a content from 0.5 to 5% by weight of the composition.

4. The composition according to claim 1, wherein the branched polypropylene is obtained by reaction of a linear polypropylene polymer with a conjugated diene.

5. The composition according to claim 1, wherein the branched polypropylene has a strain hardening degree ($\lambda$max) equal to or higher than 2.0.

6. The composition according to claim 1, wherein the polyolefin polymer is chosen from an ethylene-vinyl acetate polymer, a methyl methacrylate polymer, a vinyl acetate polymer, an ethylene-methyl methacrylate polymer, an ethylene-butyl acrylate polymer, an ethylene-octene polymer and combinations thereof.

7. The composition according to claim 1, wherein the branched polypropylene has a melt index of 1 gram/10 minutes to 200 grams/10 minutes at 230° C./2.16 kg.

8. The composition according to claim 1, wherein the polyolefin polymer has a density from 0.850 to 0.965 g/cm$^3$.

9. The composition according to claim 1, having a viscosity from 100 to 3 000 mPa·s at at least one temperature within the range of 120 to 205° C.

10. The composition according to claim 1 further comprising a branched polyethylene, and/or an acid-modified polyolefin.

11. The composition of claim 1, wherein the branched polypropylene is a copolymer comprising at least 50% by weight of propylene units.

12. The composition of claim 1, having a viscosity from 100 to 1 200 mPa·s at at least one temperature within the range of 120 to 205° C.

13. The composition of claim 1, wherein the branched polypropylene is copolymer.

14. A method, comprising applying the composition of claim 1 on the surface of a substrate.

15. The method of claim 14, wherein the composition is used as an adhesive for a sealing label.

16. A method for reducing stringing of a hot melt adhesive composition, comprising adding a branched polypropylene to the hot-melt adhesive composition at a content from 0.1 to 10% by weight of the hot-melt adhesive composition.

17. The method according to claim 16, wherein the branched polypropylene is obtained by reaction of a polypropylene polymer with a conjugated diene.

18. The method according to claim 16, wherein the branched polypropylene is added at a content from 0.5 to 5% by weight of the hot-melt adhesive composition.

19. The method according to claim 16, wherein the branched polypropylene is a homopolymer or a random copolymer comprising at least 50% by weight of propylene units.

* * * * *